United States Patent [19]

Komarneni et al.

[11] Patent Number: 4,537,710

[45] Date of Patent: Aug. 27, 1985

[54] METHOD OF STORING RADIOACTIVE WASTES USING MODIFIED TOBERMORITE

[75] Inventors: Sridhar Komarneni; Della M. Roy, both of State College, Pa.

[73] Assignee: The United States of America as represented by the United States Department of Energy, Washington, D.C.

[21] Appl. No.: 547,266

[22] Filed: Oct. 31, 1983

[51] Int. Cl.³ .............................................. G21F 9/16
[52] U.S. Cl. ..................................... 252/628; 252/631
[58] Field of Search ................. 252/628, 631; 106/306

[56] References Cited

U.S. PATENT DOCUMENTS 4,432,804  2/1984  Tamura .............................. 106/306

OTHER PUBLICATIONS

Diamond et al., "Effects of Isomorphous Substitution . . ." *The Amer. Mineralogist*, vol. 51 (1966) p. 388.
Kalousek et al., "Crystal Chemistry of Hydros Calcium Silicates . . ." *JACS*, vol. 40, (1957) p. 74.
Moore et al., "Radioactive Waste Fixation in FUE TAP" ORNL/TM-6573 (Mar. 1979).
Moore et al., "Leach Behavior of Hydrofracture Grout . . ." ANS Annual Meeting (Jun. 1976).
Komarneni et al., "Mechanisms of Immobilization of Nuclear Waste Elements . . ." *Cement and Concrete Res.* vol. 11 (1981) pp. 789-794.
Komarneni et al., "Hydrothermal Interactions of Cement . . ." Materials Research Soc. Ann. Mtg. Nov. 1982.
Komarneni et al., "Al-Substituted Tobermorite . . ." *Cement & Concrete Research* vol. 12 (1982) pp. 773-780.
Komarneni et al., "Hydrothermal Interactions of Cement . . ." *MRS Symp. Proc.* vol. 15 (1983) p. 55.
Komarneni et al., "Tobermorites . . ." *Science* vol. 221 (1983) pp. 647-648.
Hara et al., "Formation of 10 Å and 14 Å Tobermorite . . ." *Chem. Abstracts* vol. 98 (1983) 39623d.

*Primary Examiner*—Edward A. Miller
*Attorney, Agent, or Firm*—James W. Weinberger; Walter L. Rees; Judson R. Hightower

[57] ABSTRACT

A new cation exchanger is a modified tobermorite containing aluminum isomorphously substituted for silicon and containing sodium or potassium. The exchanger is selective for lead, rubidium, cobalt and cadmium and is selective for cesium over calcium or sodium. The tobermorites are compatable with cement and are useful for the long-term fixation and storage of radioactive nuclear wastes.

5 Claims, No Drawings

METHOD OF STORING RADIOACTIVE WASTES USING MODIFIED TOBERMORITE

CONTRACTUAL ORIGIN OF THE INVENTION

The United States Government has rights in this invention pursuant to prime Contract No. DE-AC06-76RL01830, Subcontract No. E-512-04200, between the U.S. Department of Energy and The Pennsylvania State University.

BACKGROUND OF THE INVENTION

This invention relates to an ion-exchange material. More specifically this invention relates to an ion-exchange material which is selective for cesium and other ions and which is compatible with concrete for the long term storage of radioactive nuclear wastes. This invention also relates to a method of fixing cesium and other ions for long-term storage.

Cooling water flowing through nuclear power reactors becomes radioactive over a period of time due to the presence of radioactive cesium, strontium, cobalt and other ions. Situations also arise in nuclear power plants which result in the presence of large quantities of radioactive cesium in the cooling water. At the present time, these radioactive ions are generally removed by passing the cooling water through an ion-exchanger which removes the radioactive ions from the cooling water. These ion-exchangers, which are generally synthetic organic resins, eventually become saturated with radioactive ions and must either be regenerated or removed from service and disposed of in a safe manner.

These ion-exchange resin wastes, as well as other low-level radioactive wastes are often disposed of by means of shallow land burial. Until recently, the majority of resin wastes have simply been dewatered and packaged in large carbon steel liners prior to shipment to the burial site. However at present the United States Nuclear Regulatory Commission (NRC) requires that all new commercial power plants licensed have the capability to solidify ion-exchange resin waste.

Low, intermediate and high level nuclear waste may also be disposed of into deep wells hundreds or thousands of feet deep. The borehole of these wells then must be sealed to prevent the wastes from rising and contaminating upper level ground water. Nuclear wastes are also disposed of by blending the waste with a mixture of cementitious materials and selected clays such as Grundite illite to form a grout. The grout is injected 800 to 1000 feet underground into cracks produced in shale bed formations by the pressure of the injected grout. Here the mixture solidifies, fixing the radionuclides. The clays in the grout act as an ion exchanger which prevent the radioactive ions, such as cesium, from being leached from the grout.

Studies have indicated that ion-exchange resin waste incorporated into portland cement exhibits poor waste performance. The waste forms have been shown to swell and crack, which will permit the entrance of ground water into the solid and diminish the benefits inherent in solidification. With any of the other methods of waste disposal, the possibility is always present that flowing ground-water will, over a period of time leach radioactive ions from the cementitious matrix. Of a particular problem is cesium ion which readily exchanges with calcium ions found in most ground water.

Tobermorite, a calcium silicate hydrate mineral was described in "The American Mineralogest", Vol. 51, March–April 1966, and incorporated herein by reference, as being produced by auto claving concrete or sand-lime masonry blocks, apparently serving as the principal binding agent in these building materials. Furthermore, it was found that there are several poorly-crystalline calcium silicate hydrates which are closely related to tobermorite. One of these is a tobermorite gel (or C-S-H gel) which is the basic cementing compound produced by the normal hydration of portland cement. For these reasons, tobermorite is believed to be very stable and compatible with cement.

SUMMARY OF THE INVENTION

We have discovered that a synthesized, modified tobermorite, has ion-exchange properties and selectivity properties which are intermediate between those of clay minerals and zeolites. Furthermore, because the tobermorites have been found to be important in the hydration of cement, the incorporation of tobermorites into cement or concrete for the fixation of radionuclides should provide a very stable storage media.

The ion-exchanger of the invention is a modified tobermorite containing aluminum isomorphously substituted for silicon and containing, per hundred grams, from about 1 to about 200 milliequivalents of an alkali metal such as sodium or potassium. The ion-exchanger has the formula: $M_b Ca5Si_{6-b}Al_b H_2 O_{18} \cdot 4H_2O$, where M=Na, K or a mixture thereof and b =0.01 to 0.9.

The invention is also a method for fixing metal ions contained in liquid low and intermediate level nuclear wastes for long term storage by contacting the liquid waste with an ion exchanger consisting of a modified tobermorite containing aluminum isomorphously substituted for silicon and containing from about 1 to about 200 milliequivalents per 100 grams of sodium or potassium whereby the ions in the liquid waste are preferentially taken up by the ion-exchange material, separating the ion-exchange material from the liquid, mixing the ion-exchange material containing the ions with portland cement to form a mixture containing up to about 40 weight percent ion-exchanger material, and solidifying the mixture, thereby fixing the ions for storage.

The ion-exchanger has been found to be particularly suitable for cesium ions, preferring the cesium over calcium or sodium. It has also been found to be a good sorbent for lead, rubidium, cobalt and cadmium and is expected to have good sorption properties for most other radionuclides.

Because of the high degree of compatibility between the ion-exchange material and portland cement, the mixture of the ion-exchanger of the invention and portland cement should have a number of applications in addition to the direct fixation of nuclear waste materials. For example a mixture of the ion-exchanger could be used to seal boreholes of deep wells containing buried nuclear wastes. The ion-exchange properties of the cement would help block the migration of radioactive ions through the cement seal. In a similar manner, a portland cement-ion-exchanger mixture could be used as a liner for nuclear waste burial grounds where the ion-exchange properties would prevent the passage of any leached radioactive ions from the burial ground through the liner into the subsurface areas where they might migrate into the ground water.

The ion-exchange material of the invention is particularly suitable for use as a substitute for resinous ion-exchangers in the removal of cesium and other radioactive ions from the cooling systems of operating nuclear power reactors. The material is especially suitable for removing from the coolant, high levels of cesium associated with fuel element ruptures. The compatibility of the tobermorites with cement would permit safer and more permanent encapsulation and long-term storage of the radioactive waste than does organic ion-exchange material.

It is therefore one object of the invention to provide a new ion-exchange material.

It is another object of the invention to provide a new ion-exchange material which has a high capacity for radioactive ions such as cesium, lead, rubidium, cobalt and cadmium.

It is another object of the invention to provide a new ion-exchange material which is compatible with and can be incorporated into portland cement.

Finally, it is the object of the invention to provide a method of fixing radioactive ions found in low and intermediate level nuclear waste liquids for long term storage.

DETAILED DESCRIPTION OF THE PREFERRED EMBODIMENT

These and other objects of the invention may be met by a modified tobermorite containing aluminum isomorphously substituted for up to 15 weight percent of silicon and containing per 100 grams, from about 1 to about 200 milliequivalents of sodium and or potassium. Other objects of the invention may be met by passing a solution, which may contain cesium, lead, rubidium, cobalt or cadmium, in addition to other ions, through an ion-exchange material consisting of a modified tobermorite containing aluminum isomorphously substituted for up to 15 weight percent of silicon and containing per 100 grams, about 1 to 200 milliequivalents of sodium and or potassium, whereby any cesium, lead, rubidium, cobalt and cadmium ions are selectively removed from the solution. The ion-exchange material may then be dewatered and mixed with portland cement to form a mixture containing up to about 40 weight percent ion-exchange material. The mixture is then mixed with water to form a gel and allowed to harden thereby fixing the radioactive ions for long term storage.

The aluminum substituted tobermorite of the invention has the formula $M_b Ca_5 Si_{6-b} H_2 O_{18}.4H_2O$, where $M = K$, Na or a mixture thereof and $b = 0.01$ to $0.9$.

The modified tobermorite may contain aluminum isomorphously substituted for from 1 to 15 weight percent of the total silicon in the structure. The presence of aluminum increases the ion-exchange capacity of natural tobermorite and is necessary for selectivity for cesium and other ions. This selectivity increases with increasing aluminum concentration. The presence of sodium or potassium or a mixture of both is also necessary for selectivity for cesium and other ions. The milliequivalency of the sodium and or potassium present in the tobermorite may be directly related to the concentration of aluminum. These alkali metals are believed to occupy exchange sites on the aluminum atom which are responsible for the ion selectivity of the material.

The ion-exchanger can be prepared from a number of different materials under hydrothermal conditions. For example a stoichiometric amount of silicon and calcium oxide, together with aluminum, as aluminum chloride or an aluminum-containing mineral, and an excess of sodium and or potassium can be mixed together and heated in a pressure vessel to 180–200° C. for 1 to 2 days to produce an aluminum substituted tobermorite containing the alkali metal. Increasing the pressure and or temperature will increase the substitution of aluminum for silicon in the tobermorite to obtain an ion-exchanger containing 15 weight percent aluminum substituted for silicon. The use of an aluminum silicate such as phillipsite or kaolinite as a starting material will also facilitate the incorporation of aluminum into tobermorite structure. The presence of aluminum substituted for silicon together with the presence of sodium or potassium is necessary for the high cesium selectivity properties of the tobermorite. Aluminum concentrations higher than about 15 weight percent should be avoided because they may result in phase changes which might affect compatibility of the mineral with cement. The presence of an excess of sodium and or potassium ions when preparing the tobermorite is necessary to prevent calcium from occupying any exchange sites on the aluminum atom and permanently reducing the exchange capacity of the material.

The synthetic tobermorite containing sodium or potassium may be used as an ion-exchanger in a manner similar to a zeolite or other known ion-exchange material, i.e. by passing the solution containing the ions through the tobermorite whereby the ions in the solution exchange for the sodium or potassium in the tobermorite.

The substituted tobermorite has been found selective for cecium, lead, rubidium, cobalt and cadmium ions and is expected to be selective for other metal ions usually found in nuclear waste solutions such as strontium.

The material is particularly selective for cesium ions, and will selectively sorb cesium from solutions containing much higher concentrations of calcium or sodium.

The tobermorite containing the sorbed ions may be incorporated in portland cement in an amount up to about 40 weight percent. A liquid such as water is then added to the tobermorite cement mixture to form a gel which is then allowed to harden, fixing the ions in the cement for long-term storage. The strong attraction of the tobermorite for the radioactive ions, particularly cesium, will reduce any leaching of the ions from the concrete by ground water.

Alternatively, the substituted tobermorite of the invention might be mixed with concrete in an amount up to about 40 weight percent and used as a liner for a nuclear waste burial ground. The tobermorite in the liner acting as a strong ion-exchanger to prevent any radioactive ions from passing through the liner into the sub-soil where they could contaminate the ground water.

EXAMPLES 1–8

A number of tobermorites were synthesized from different starting materials at 80° C. to 200° C. Zeolites, such as clinoptilolite, phillipsite and Linde 3A were used as some of the silica-alumina sources. Other materials such as amorphous $SiO_2$ (−400 mesh); $Na_2SiO_3.9H_2O$; $AlCl_3.6H_2O$; and NaOH were also used. Teflon capsules were used for synthesis at 85° C. and 180° C. at saturated steam pressure in a pot furnace; polyethylene bottles were used for synthesis at 80° C. in an oven and gold capsules were used at 180° C. and 200° C. in cold-seal vessels under a confining pressure of 30 MPa. The solids were removed from the capsules or bottles and washed with deionized water prior to cation exchange and cesium sorption measurements.

The cation exchange capacity (CEC) of each sample was measured by washing a known weight (10 to 50 mg) twice with 3N KCl, then washing three times with 0.01N KCl to remove excess KCl and to prevent hydrolysis of $K^+$ from the exchange sites (a correction was made for excess 0.01N KCl, which was determined by weighing); the $K^+$ was displaced from the exchange sites with four washings of 1N CsCl (½ hour equilibration for each). $K^+$ was determined by atomic emission spectroscopy. When $NH_4Cl$ was used to displace $K^+$ from the exchange sites, lower CEC's were obtained probably because of $H^+$ bonding and poor diffusion of $NH_4^+$ into the structure. Selective cesium sorption by the various tobermorites was determined by adding 10 ml of 0.02N $CaCl_2$ or 0.02N NaCl containing 0.0002N CsCl ($Ca^{2+}/Cs^+$ or $Na^+/Cs^+$ equivalent ratio is 100 to 1) to 20 mg of sample, equilibrating for 1 day in glass vials, centrifuging to separate solid and solution phases, and analyzing $Cs^+$ in solution by atomic absorption spectrophotometry. Cesium sorption as expressed $K_d$ (in milliliters per gram) values ($K_d$ is a distribution coefficient defined as the ratio of the amount of cesium sorbed per gram of solid to the amount of cesium remaining per milliliter of solution). The results are given in Table 1 below:

sure. This difference is attributed to the greater substitution of aluminum for silicon along with sodium or potassium in the structure synthesized at higher temperatures and pressures.

As can be seen, the aluminum-substituted tobermorites exhibit a high selectivity for cesium and other ions. The similarity of the tobermorite to the cementitious matrix in concrete will provide a new material for the long-term storage of cesium and other radioactive ions.

The embodiments of this invention in which an exclusive property or privilege is claimed are defined as follows:

1. A method of fixing metal ions contained in liquid low and intermediate level nuclear wastes for long-term storage comprising:
    contacting the liquid waste with an ion-exchange material which is a modified tobermorite containing aluminum isomorphously substituted for silicon and containing per 100 grams, about 1 to 200 milliequivalents of an alkali metal selected from the group consisting of sodium, potassium and mixtures thereof, whereby the metal ions in the liquid waste are taken up by the ion-exchange material;
    separating the ion-exchange material from the liquid;
    mixing the ion-exchange material containing the ions

TABLE I

| Sample No. | Initial sample mixture | Temperature (°C.) pressure: duration (days) of treatment | Cation exchange capacity (meq/100 g) | Cesium sorption $K_d$ (ml/g) from solution 0.02N $CaCl_2$ | 0.02N NaCl |
|---|---|---|---|---|---|
| 1 | 420 mg $Na_2SiO_3.9H_2O$ + 39.6 mg $AlCl_3.6H_2O$ + 76.8 mg CaO | 80° C.; SS; (approx. 1 MPa); 1 | 182 | 4,144 ± 626 | 2,683 ± 1 |
| 2 | 420 mg $Na_2SiO_3.9H_2O$ + 39.6 mg $AlCl_3.6H_2O$ + 76.8 mg CaO | 85° C.; SS; 4 | 164 | 756 ± 7 | 654 ± 9 |
| 3 | 210 mg $Na_2SiO_3.9H_2O$ + 5.3 mg kaolinite + 38.4 mg CaO | 180° C.; 30 MPa; 14 | 146 | 14,240 | |
| 4 | 45.9 mg phillipsite + 16 mg amor. $SiO_2$ + 38.4 mg CaO | 200° C.; 30 MPa; 28 | 148 | 20,370 ± 1,985 | 8,930 |
| 5 | 22.2 mg Linde 3A + 34.8 mg amor. $SiO_2$ + 38.4 mg CaO | 200° C.; 30 MPa; 28 | 158 | 6,328 ± 258 | 3,670 |
| 6 | 50.7 mg clinoptilolite, Idaho, + 10.4 mg amor. $SiO_2$ + 38.4 mg CaO | 200° C.; 30 MPa; 28 | 80 | 9,150 | 4,412 ± 157 |
| 7 | 2.22 g Linde 3A + 3.48 g amor. $SiO_2$ + 3.84 g CaO + 24 g NaOH | 80° C.; SS; 22 | 144 | 461 ± 15 | 484 ± 18 |
| 8 | 5.04 g CaO + 5.4 g amor. $SiO_2$ + 32 g NaOH | 80° C.; SS; 12 | 130 | 42 | 51 ± 2 |

*Plus or minus denotes standard deviation (N weighting) based on three or four replicates. Average of duplicate determinations. Abbreviations: SS, saturated steam; amor., amorphous.

As can be seen from the results in Table 1, all of the tobermorite samples exhibit ion-exchange properties. However, the tobermorite not substituted by aluminum of sample 8 has little or no selectivity for the large and less hydrated $Cs^+$ from 0.02N $CaCl_2$ or 0.02N NaCl. The aluminum-substituted tobermorites exhibit selectivity for $Cs^+$, i.e. high cesium sorption $K_d$ from 0.02N $CaCl_2$ or 0.02N NaCl. Sample 1 has a CEC of 182/meq 100 g and sorbed 9 meq of cesium per 100 grams from 0.02N $CaCl_2$ (the equivalent ratio of CEC to cesium sorbed is 20 to 1) even though the $Ca^{2+}/Cs^+$ ratio in solution is 100 to 1. Thus the cesium sorption is in excess of what can be expected from the total exchange capacity of the Al substituted tobermorite and the $Ca^{2+}/Cs^+$ equivalent ratio in the equilibrating solution. The high selectivity for $Cs^+$ arises from the amount of aluminum substitution for silicon and possibly from resulting changes in the structure. Aluminum-substituted tobermorites synthesized at higher temperatures and pressure have greater selectivity for cesium than those synthesized at lower temperatures and saturated steam preswith portland cement to form a mixture containing up to about 40 weight percent ion-exchange material; and
solidifying the mixture, thereby fixing the ions for long-term storage.

2. The method of claim 1 wherein the tobermorite contains from about 1 to about 15 weight percent aluminum.

3. The method of claim 2 wherein the waste solution may contain cesium, lead, rubidium, cobalt and cadmium ions.

4. A method of fixing radioactive cesium for long-term storage comprising:
    contacting a solution containing cesium and other metal ions with a modified-tobermorite containing aluminum isomorphously substituted for silicon and containing per 100 grams, about 1 to 200 milliequivalents of an alkali metal selected from the group consisting of sodium, potassium and mixtures thereof, whereby the cesium is taken up by the modified tobermorite;

separating the tobermorite containing the cesium from the liquid;

mixing the tobermorite containing the cesium with portland cement to form a mixture containing up to about 40 weight percent tobermorite; and solidifying the mixture, thereby fixing the cesium ions for long-term storage.

5. The method of claim 4 wherein the tobermorite contains from about 1 to about 15 weight percent aluminum.

* * * * *